United States Patent
Shimoyama et al.

(10) Patent No.: US 6,643,496 B1
(45) Date of Patent: *Nov. 4, 2003

(54) SYSTEM, METHOD, AND APPARATUS FOR ADJUSTING PACKET TRANSMISSION RATES BASED ON DYNAMIC EVALUATION OF NETWORK CHARACTERISTICS

(75) Inventors: Tomohiko Shimoyama, Yokohama (JP); Koichi Yano, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/277,824

(22) Filed: Mar. 29, 1999

(30) Foreign Application Priority Data

Mar. 31, 1998 (JP) .............................. 10-087648
May 29, 1998 (JP) .......................... 10-150221

(51) Int. Cl.$^7$ ............................................. H04L 12/56

(52) U.S. Cl. ........................................ 455/69; 370/232

(58) Field of Search ............................ 455/92, 69, 452, 455/466; 370/236, 231, 232

(56) References Cited

U.S. PATENT DOCUMENTS 5,367,523 A * 11/1994 Chang et al. ................ 370/235
5,892,754 A *  4/1999 Kompella et al. .......... 370/236
6,215,772 B1 *  4/2001 Verma ......................... 370/231

* cited by examiner

Primary Examiner—Thanh Cong Le
Assistant Examiner—Nick Corsaro
(74) Attorney, Agent, or Firm—Fitzpatrick, Cella, Harper & Scinto

(57) ABSTRACT

Data can be transmitted efficiently by sending control information as demanded by the status of a network. To accomplish this, a transmitting terminal transmits data using the Real-Time Transport Protocol (RTP), and control information, which is for ascertaining the status of the network, is transmitted by both the transmitting terminal and a receiving terminal using the Real-Time Transport Control Protocol (RTCP). The transmitting terminal transmits the control information as an RTCP packet at predetermined time intervals. If the transmission rate does not attain a target rate, however, the transmitting terminal raises the transmission rate by a predetermined percentage regardless of the predetermined time intervals. If it is judged that transmission loss has occurred based upon the control information sent from the receiving terminal, the transmitting terminal lowers the transmission rate by a predetermined percentage regardless of the predetermined time intervals.

15 Claims, 14 Drawing Sheets

SYSTEM, METHOD, AND APPARATUS FOR ADJUSTING PACKET TRANSMISSION RATES BASED ON DYNAMIC EVALUATION OF NETWORK CHARACTERISTICS

BACKGROUND OF THE INVENTION

This invention relates to a communications apparatus, communications control method, system and storage medium for transmitting data from a transmitting terminal to a receiving terminal via a network. More particularly, the invention relates to real-time transfer of data.

In systems that are now available, a connection is made to a communications network such as the Internet and real-time data such as motion pictures and sound obtained by a video camera and microphone ancillary thereto is transmitted through the network. When such a system is constructed, it is necessary to cope with the conditions of communications lines the states of which are constantly changing. More specifically, it is necessary to send data from the transmitting side at a rate at which it can be received on the receiving side.

In order to control the rate at which data is sent on the transmitting side, it is required to know the effective receiving rate on the receiving side. To achieve this, not only must the original data transmission be performed but it is also necessary for the transmitting and receiving sides to exchange control information.

RFC 1889, which is known as a Real-Time Transport Protocol (RTP), can be mentioned as such a communications protocol. With the Real-Time Transport Protocol, RTP (RTP Data Transfer Protocol) is used to send and receive data, and RTCP (RTP Control Protocol) is used to send and receive control information.

In the prior art, however, the sending and receiving of control information is carried out periodically (once every five seconds is recommended as the transmission interval of RTCP according to RTP). When the conditions on a communications line deteriorate, therefore, there is a delay in the detection of the change and a delay in feedback information indicating that the transmission rate was changed to cope with the altered conditions.

For example, in a system in which there is a flow of control information once every five seconds, assume that a change in line conditions is detected five seconds after the change in a worst-case scenario and that the transmission rate on the transmitting side is altered as a result. Whether the altered transmission rate is appropriate or not is then judged. This judgment cannot be made until after ten seconds in the worst case. When line status changes, therefore, there is an increase in dropped packets and a delay in packet distribution occurs.

Further, when real-time data is transmitted at a transmission rate that exceeds the bandwidth of the communications line, (1) the transmitted data is stored in the buffer of a network router or the like and, hence, there is an increase in the transmission delay, and (2) if the buffer subsequently overflows, packets are lost.

In implementations heretofore available, packet loss is monitored and transmission rate is reduced when packet loss occurs. Transmission rate thus is controlled in such a manner that packet loss will not occur.

With these conventional implementations, however, the aforementioned problem (1) of transmission delay cannot be solved even if problem (2) can be. Consequently, when these implementations are used to transmit video, as in a videoconference or the like, images that are eventually displayed on the receiving side were actually captured several tens of seconds earlier. Thus, a problem with the prior art is a long transmission delay.

SUMMARY OF THE INVENTION

Accordingly, an object of the present invention is to provide a communications control method, system and storage medium that make it possible to transmit data efficiently by transmitting control information in dependence upon the status of a network.

Another object of the present invention is to provide a communications apparatus, method, system and storage medium that make it possible to communicate with the minimum transmission delay by establishing the proper transmission rate dynamically in dependence upon the status of a network.

According to the present invention, the foregoing objects are attained by providing a communications control method for transmitting data from a transmitting terminal to a receiving terminal via a prescribed network and transmitting, at prescribed intervals, control information for ascertaining the status of the network, the method comprising the steps of detecting a change in the status of the network, and adjusting, in dependence upon the detected change in status, the frequency with which the control information is transmitted.

Further, according to the present invention, the foregoing objects are attained by providing communications apparatus for transmitting information to a receiving terminal via a prescribed network and receiving reception-status information transmitted by the receiving terminal at prescribed time intervals, comprising detecting means for detecting state of a transmission delay based upon a plurality of items of reception-status information from the receiving terminal, and control means for controlling transmission rate in dependence the detected state of the transmission delay.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Embodiments of the present invention will now be described in detail with reference to the accompanying drawings.

First Embodiment

Figure 1:
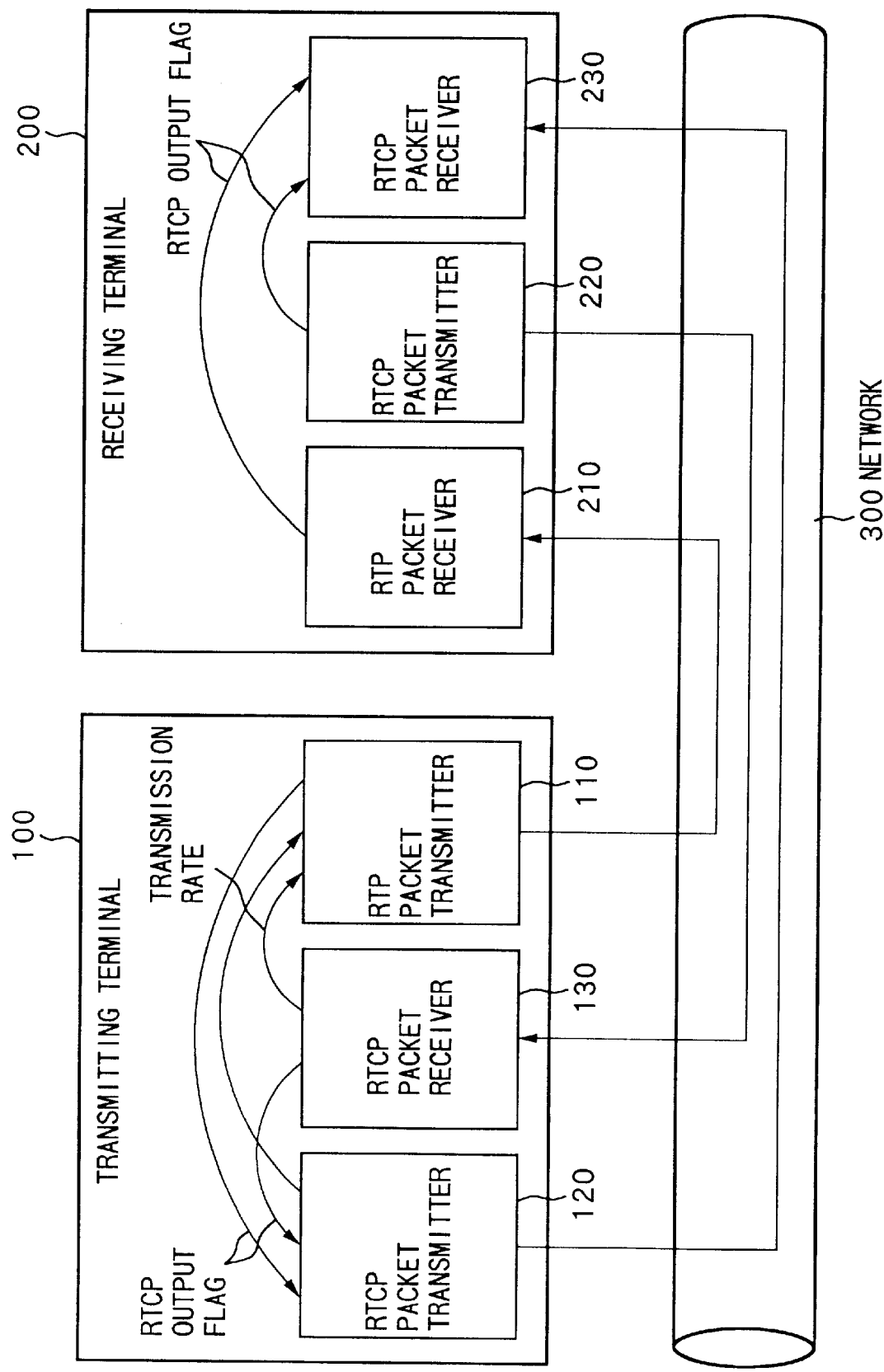
FIG. 1 is a diagram showing a system configuration according to a first embodiment of the present invention.

FIG. 1 is a diagram showing the overall system according to this embodiment. The embodiment comprises a transmitting terminal 100 (namely a terminal on a transmitting side) and a receiving terminal 200 (namely a terminal on a receiving side) connected by a network 300 (inclusive of a telephone network). The transmitting terminal 100 is an apparatus or system having a video camera and microphone and transmits real-time video/audio to the receiving terminal 200. The transmitting terminal 100 and receiving terminal 200 are mutually independent computers or systems and both have hardware for achieving a network connection. A data source (camera and microphone hardware, etc.) for performing real-time transfer is required on the transmitting side. Both can be implemented by general-purpose workstations or personal computers.

Data is transmitted from the transmitting terminal 100 to the receiving terminal 200 in accordance with RTP. Though the mechanism for sending and receiving RTP packets and RTCP packets is implemented by software in this embodiment, a similar function can be implemented by hardware and therefore the present invention is not limited to software implementation.

The transmitting terminal 100 and receiving terminal 200 send and receive video and audio data by RTP packets and transfer the relevant control data by RTCP packets as stipulated by RTP (RFC 1889). The details of RTP and RTCP are well known and need not be described here.

The transmitting terminal 100 transmits data to the receiving terminal 200 at a predetermined rate (the target rate). The sending and receiving of this data is performed using RTP packets. If line conditions deteriorate and the data cannot be sent at the target rate, the transmission rate is reduced.

The transmitting terminal 100 and receiving terminal 200 exchange communications line control information using RTCP packets and perform rate control by employing these RTCP packets.

The principal information contained in the RTCP packets sent from the receiving terminal 200 to the transmitting terminal 100 in this embodiment is as follows:

a) packet loss rate ("fraction lost") when RTCP packets are sent;

b) timestamp of the final RTCP packet accepted from the transmitting terminal at transmission of RTCP packets; and c) time ("delay since last sender report") from acceptance of an RTCP packet from the transmitting terminal to transmission of this RTCP packet.

The transmitting terminal 100 decides the transmission rate on the basis of this information. According to this embodiment, transmission rate is decided on the basis of packet loss rate. The transmission rate is lowered if packets are lost and is raised gradually if there is no packet loss. Thus, the transmitting terminal 100 operates so as to use the communications capacity of the network 300 to the fullest.

Accordingly, the receiving terminal 200 is capable of deciding a new transmission rate whenever an RTCP packet arrives, and it is expected that RTCP packets will be sent to it frequently in a case where there is a change in transmission conditions or line conditions.

The principal information contained in the RTCP packets sent from the transmitting terminal 100 to the receiving terminal 200 in this embodiment is as follows:

a) the time (sender's timestamp) at which the transmitting terminal sends an RTCP packet; and b) an indication (sender's octet) of how many bytes of data were sent cumulatively at transmission of RTCP packets by the transmitting terminal.

By accepting this information, the receiving terminal 200 is capable of calculating the transmission rate of data from the transmitting terminal 100. The transmission rate can be calculated by the following equation using two items of RTCP information (rtcp0, 1):

$$\text{transmission rate} = (\text{sender's octet of rtcp1} - \text{senders octet of rtcp0})/(\text{sender's timestamp of rtcp1} - \text{sender's timestamp of rtcp0}) \quad (1)$$

The receiving terminal 200 finds the difference between the transmission rate thus obtained and the reception rate (the reception rate is calculated based upon two items of RTP packet information, as will be described later) and sends RTCP packets to the transmitting terminal 100 frequently if the difference is large.

A large difference between the rates indicates a condition in which packet loss occurs (or a condition in which network delay is large) or that the transmitting terminal 100 is raising the transmission rate by searching for the optimum transmission rate. In the former case, it is necessary for the transmission rate to be lowered immediately on the side of the transmitting terminal 100. In the latter case, it is necessary for the effects of the increase in transmission rate to be fed back to the transmitting terminal 100 quickly and, hence, it is required that RTCP packets be sent immediately. The present invention functions to meet these requirements.

For the same reasons, the transmitting terminal 100 also transmits RTCP packets frequently when the transmission rate is changed, thereby immediately informing the receiving terminal 200 of the present transmission rate.

Though it is not employed in this embodiment, the time (RTT: Round-Trip Time) needed for a packet to make a round trip between the transmitting terminal 100 and the receiving terminal 200 can be measured from the information contained in an RTCP packet. Detecting a change in RTT and sending RTCP packets frequently also is useful. (A method of calculating RTT is as described in RFC 1889.)

The structures of the transmitting terminal 100 and receiving terminal 200 will now be described.

As shown in FIG. 1, the transmitting terminal 100 includes an RTP packet transmitter 110, an RTCP packet transmitter 120 and an RTCP packet receiver 130. The receiving terminal 200 includes an RTP packet receiver 210, an RTCP packet transmitter 220 and an RTCP packet receiver 230. These components all operate independently as separate threads and several that are shared between threads are linked through variables.

The content of processing executed by the associated processors will be described in accordance with the flowcharts of FIGS. 2 to 6.

Figure 2:
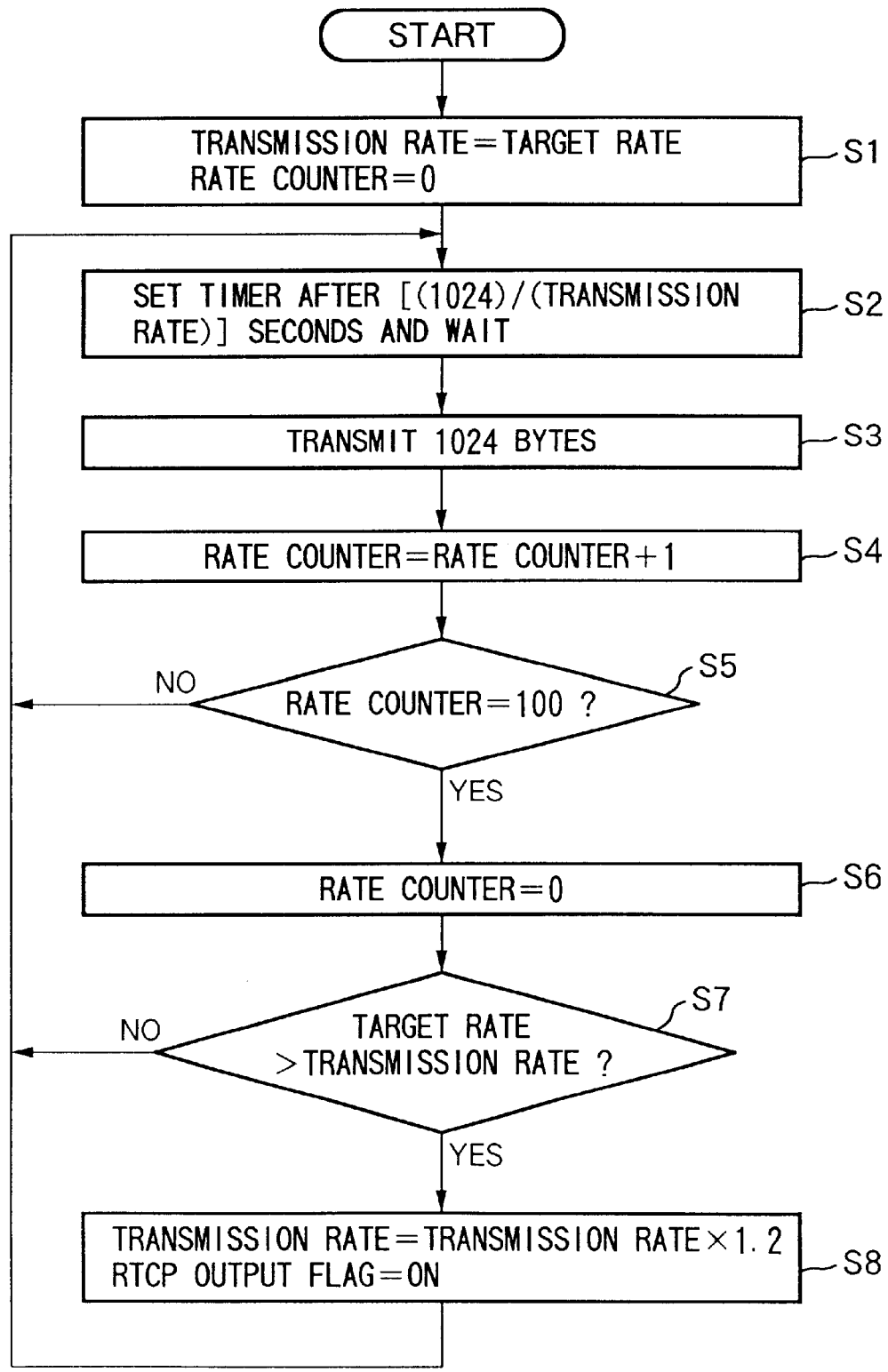
FIG. 2 is a flowchart of RTP packet transmission by a transmitting terminal.

FIG. 2 is a flowchart of processing executed by the RTP packet transmitter 110 of transmitting terminal 100.

The target rate is set as the initial value of the transmission rate and "0" is initially set in a rate counter (step S1). A timer is set to a time that is in accordance with the transmission rate, and the system waits for this time to elapse (step S2). This means waiting for the immediately preceding transmission to be completed. A current packet having a size of 1024 bytes is transmitted (step S3). The rate counter is incremented (step S4), and the processing from step S2 onward is repeated until the count in the rate counter becomes "100". When the content of the rate counter becomes "100", it is reset to "0" (step S6). The target rate and the actual transmission rate are compared (step S7). If the transmission rate has attained or exceeded the target rate, a data transfer is performed in accordance with the transmission rate prevailing at this time and, hence, control returns to step S2.

If the transmission rate is less than the target rate, on the other hand, the transmission rate is changed. In order to accomplish this, the rate is made 1.2 times the former transmission rate (i.e., raised by 20%) and an RTCP output flag (described later) is turned ON to notify the receiving side of this.

More specifically, the transmitting terminal outputs a packet having a size of 1024 bytes at fixed intervals [at intervals equivalent to (1024 bytes/transmission rate) sec]. The transmission rate is raised by a factor of 1.2 whenever 100 packets are received. When the transmission rate is changed, an RTCP output flag shared with the RTCP packet transmitter 120 is turned ON, thereby sending the RTCP packet to the receiving terminal 200 promptly so that the effects of the change in transmission rate are reported at an early time.

Figure 3:
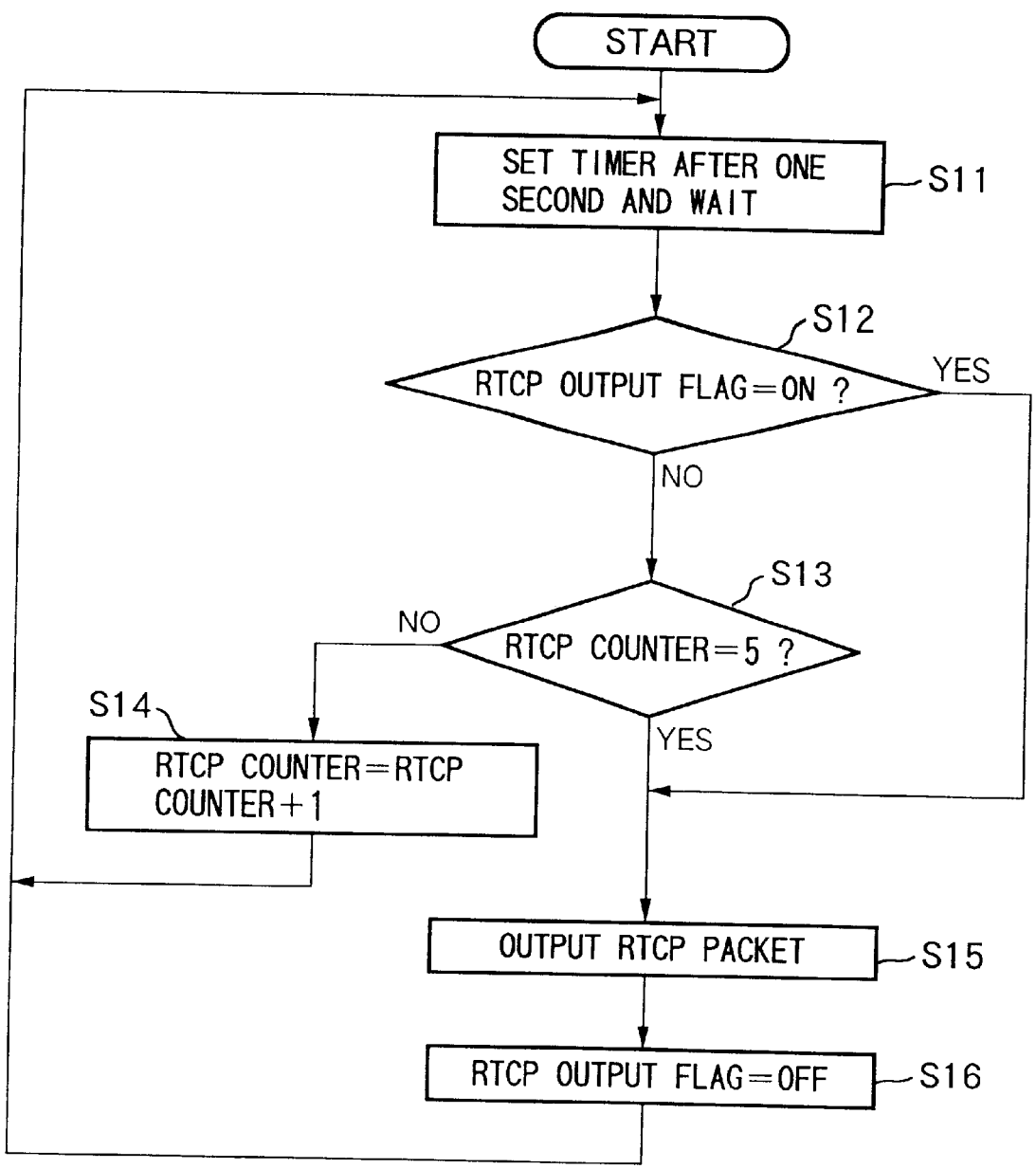
FIG. 3 is a flowchart of RTCP packet transmission by a transmitting terminal and receiving terminal.

FIG. 3 is a flowchart of processing executed by the RTCP packet transmitters 120 and 220 in the transmitting terminal 100 and receiving terminal 200, respectively.

Basically, the RTCP packet transmitter 120 becomes active, e.g., every second (step S11), and outputs an RTCP packet once every five seconds (steps S13–S16). In a case where the RTCP output flag is ON (decided by the flowchart of FIG. 2 and the flowchart of FIG. 4, which is described alter) (step S12), the RTCP packet transmitter 120 outputs an RTCP packet even if five seconds, for example, has not elapsed. It should be noted that the time of five seconds mentioned here corresponds to a prescribed interval in the present invention. However, this time interval is one that satisfies prescribed conditions and may be an interval that is capable of being varied depending upon the conditions.

Figure 4:
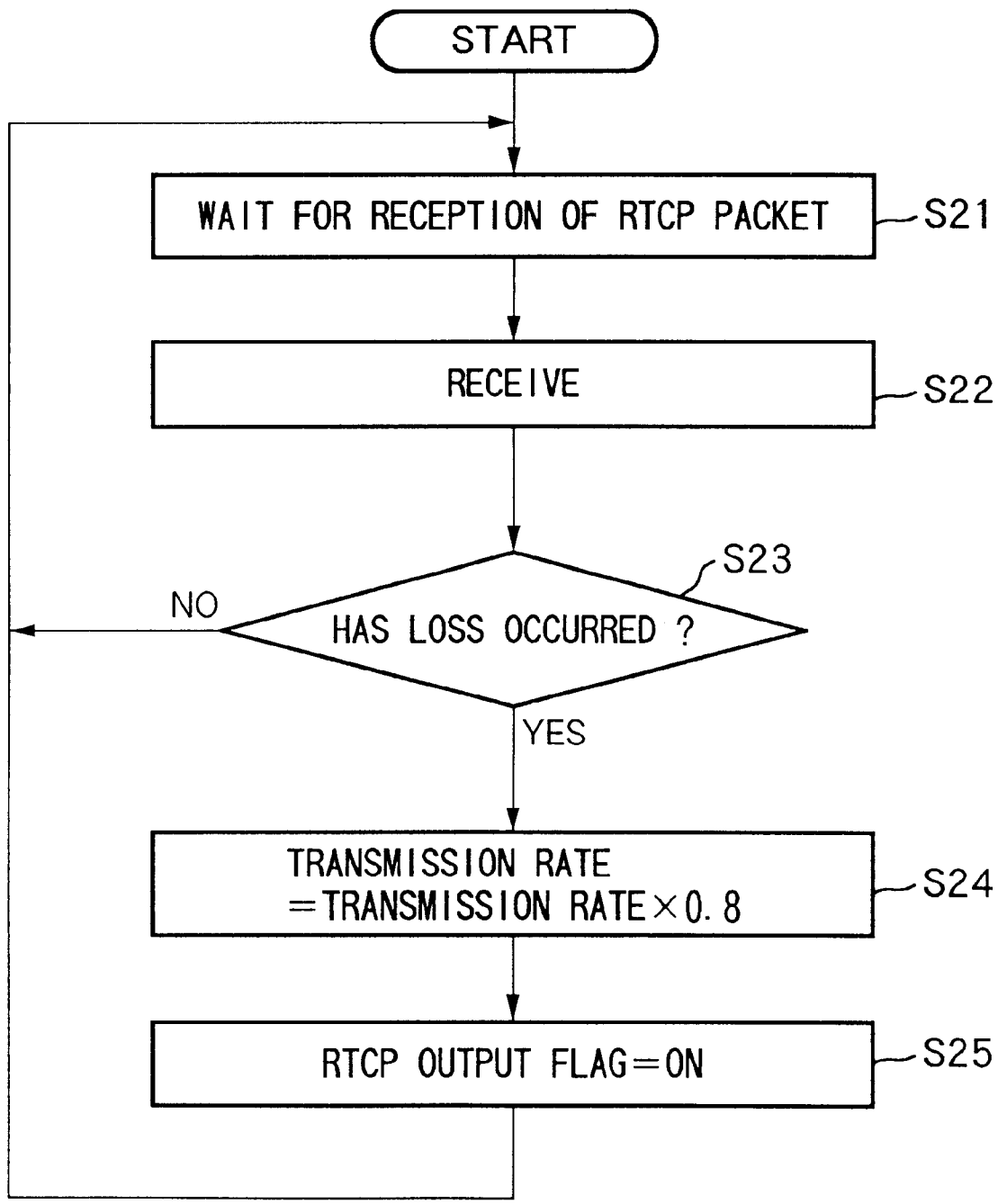
FIG. 4 is a flowchart of RTCP packet reception by the transmitting terminal.

FIG. 4 is a flowchart of processing executed by the RTCP packet receiver 130 of the transmitting terminal 100.

On the basis of an RTCP packet that has been received (steps S21, S22), the RTCP packet receiver 130 judges that packet loss has been detected by the receiving terminal (step S23) and responds by multiplying the transmission rate (which is reflected in the transmission rate of FIG. 2) of the RTP packets by 0.8 (i.e., by reducing this transmission rate by 20%). The RTCP output flag is turned ON to promptly notify the receiving terminal 200 of the effects of multiplication by 0.8.

Figure 5:
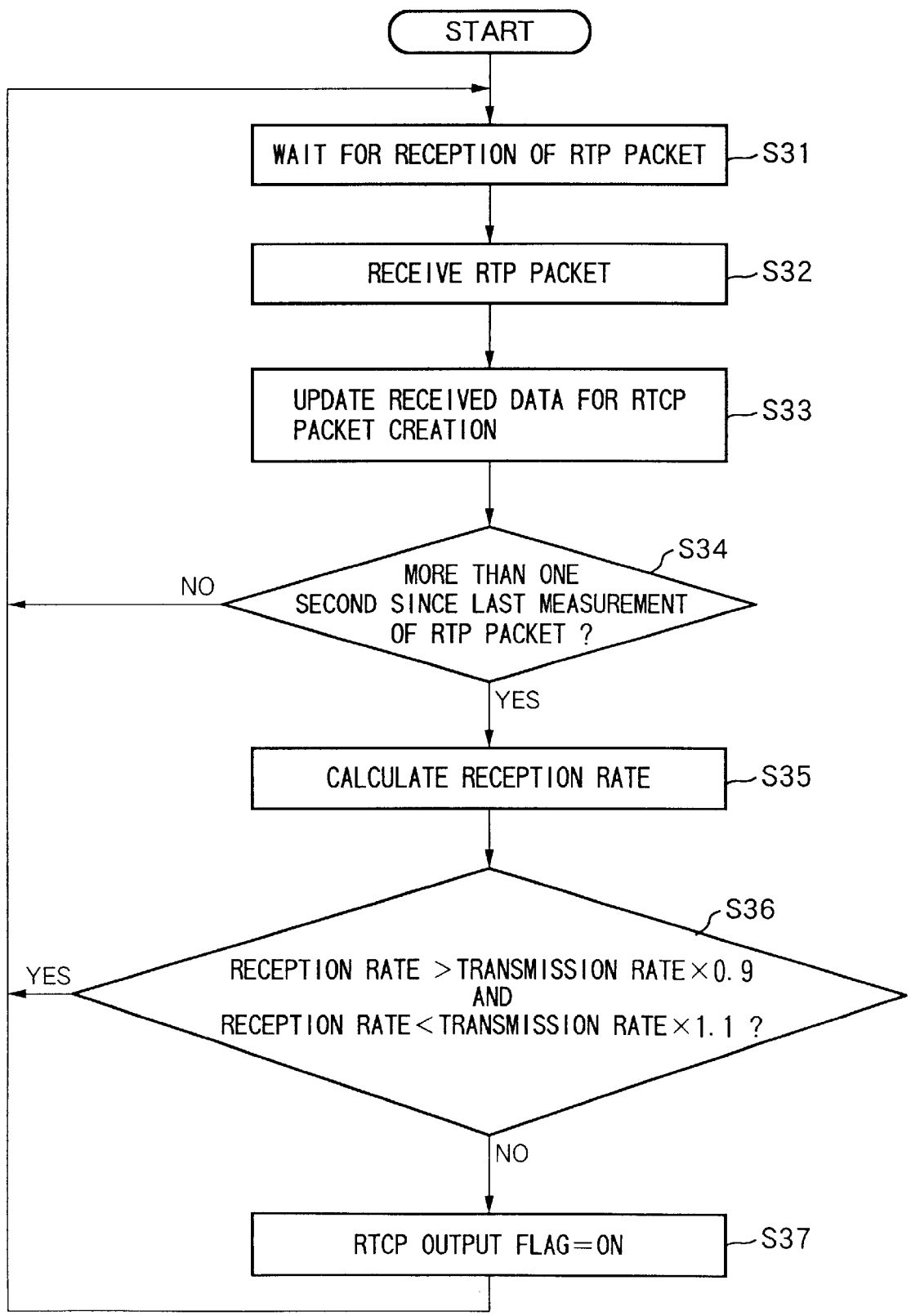
FIG. 5 is a flowchart of RTP packet reception by the receiving terminal.

FIG. 5 is a flowchart of processing executed by the RTP packet receiver 210 of the receiving terminal 200.

Upon receiving an RTP packet (steps S31, S32), the RTP packet receiver 210 stores this information (the sequence number of the RTP packet, etc.). The RTCP packet transmitter 220 constructs an RTCP packet based upon this information (step S33) and subsequently calculates the reception rate at fixed intervals (at intervals of one second or more). The approximate calculation of reception rate is performed using the following equation based upon the arrival times of two RTP packets (step S35):

reception rate=(packet size of rtcp0)/(time at which rtcp1 is received−time at which rtpc0 is received)

If it is judged that the difference between the reception rate and transmission rate is large (step S36), the RTP packet receiver 210 turns the RTCP output flag ON and outputs an RTCP packet to the RTCP packet transmitter 220 immediately. Whether the reception rate falls within ±10% of the transmission rate is the criterion serving as a threshold value used in evaluating the size of the above-mentioned difference.

Figure 6:
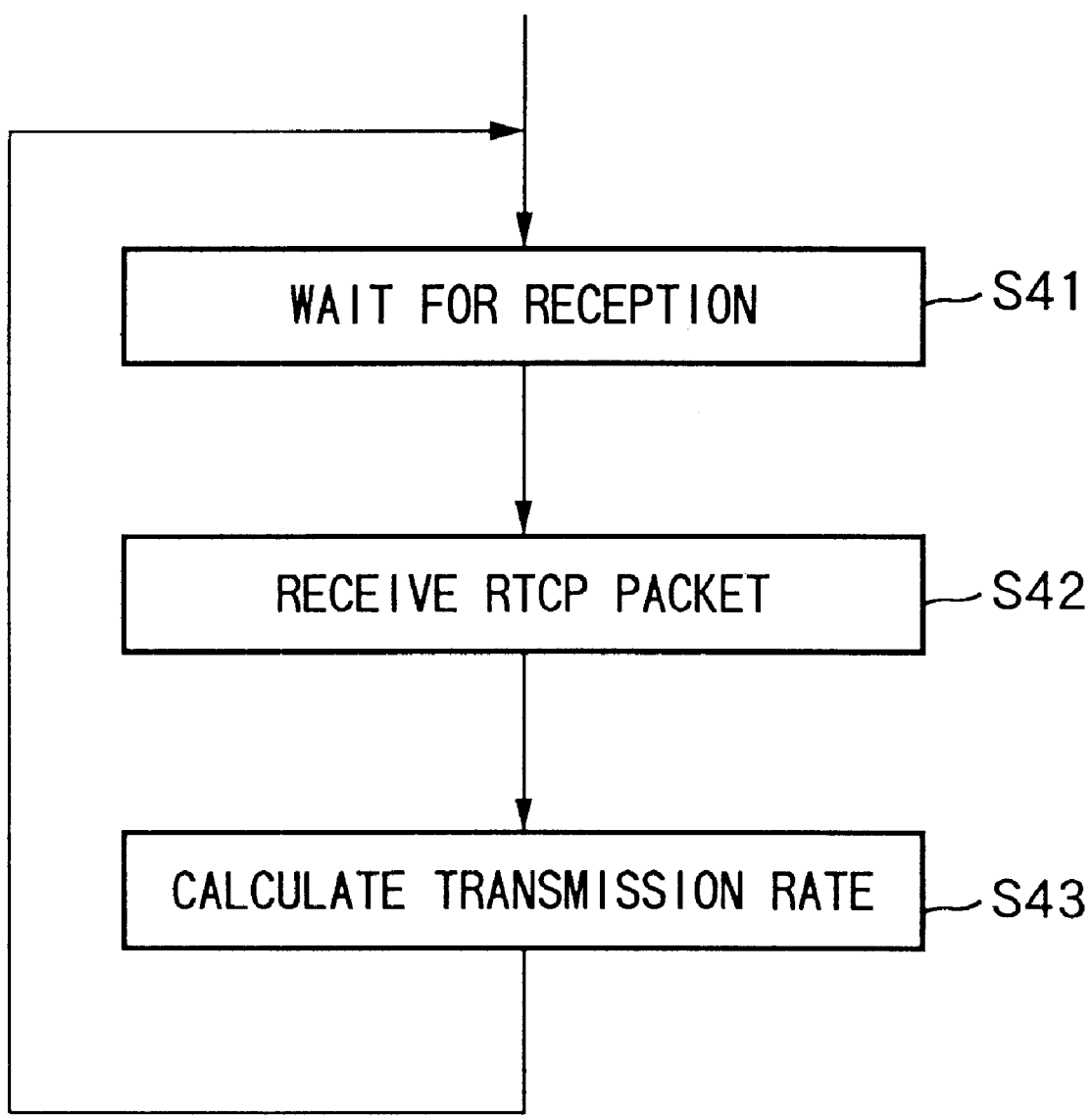
FIG. 6 is a flowchart of RTCP packet reception by the receiving terminal.

FIG. 6 is a flowchart of processing executed by the RTCP packet receiver 230 of the receiving terminal 200. Upon receiving an RTCP packet (steps S41, S42), the RTCP packet receiver 230 calculates the transmission rate of the transmitting terminal 100 in accordance with Equation (1) cited above (step S43). The result of performing the calculation is used within the RTP packet receiver 210, as indicated earlier.

Thus, in accordance with the first embodiment, as described above, the frequency with which network control information is sent can be changed in response to changes in line conditions or changes in transceiving conditions, etc. This makes it possible to apply feedback to transmission and reception more quickly in comparison with the conventional method of sending control information at fixed intervals. Communication can be carried out with less packet loss and less transmission delay.

Though an arrangement having a video camera has been described as the transmitting terminal in the first embodiment, the invention is not limited to this arrangement. For example, motion pictures can be stored as files and these can be transmitted. Further, the transmitted data may be other data (e.g., audio data) and is not limited to image data.

Further, in the first embodiment, the invention has been described in accordance with RFC 1889 as the specifications of the communications protocol. However, the present invention is not limited to this arrangement. Further, the size (1024 bytes) of one packet and the timer value (one second in FIG. 3) mentioned in the first embodiment do not impose a limitation upon the present invention and may be any values whatsoever.

In accordance with the first embodiment, as described above, data can be transmitted efficiently by transmitting control information in dependence upon network conditions.

Second Embodiment

In a second embodiment of the present invention, transmission rate is controlled based upon transmission delay time on a communications line.

In particular, when it is difficult to obtain transmission delay time from a transmission protocol, as in the Real-Time Transport Protocol (RTP) (RFC 1889), the transmission delay time is estimated from RTT (Round-Trip Time), namely the time required for round trip of a packet on a communications line.

Whether transmission delay time changes as a result of increasing or decreasing the transmission rate is a factor used in controlling the transmission rate subsequently. This is realized by increasing or decreasing the transmission rate periodically and performing monitoring to determine how the transmission delay time varies at such time.

Control is performed as follows when raising the transmission rate: If the transmission delay time does not increase even when the transmission rate is raised, it is judged that sufficient communications bandwidth remains and, hence, the transmission rate is raised further. If the transmission delay time increases, it is judged that data in excess of the communications bandwidth is being sent and any further elevation of the transmission rate is suspended. Transmission is continued at the currently prevailing transmission rate for a prescribed period of time. At elapse of this time, a process for lowering transmission rate, set forth below, is executed.

If, during the process of lowering the transmission rate, the transmission delay time decreases when the transmission rate is being lowered, it is judged that data is being buffered on the communications line and, hence, the transmission rate is lowered further. If the transmission delay time does not change, on the other hand, it is judged that data is not being buffered on the communications line and, hence, any further lowering of the transmission rate is suspended. Transmission is continued at the currently prevailing transmission rate for a prescribed period of time. At elapse of this time, processing for raising transmission rate, described above, is executed. The transition from one state to another described above is illustrated in FIG. 7.

Figure 8:
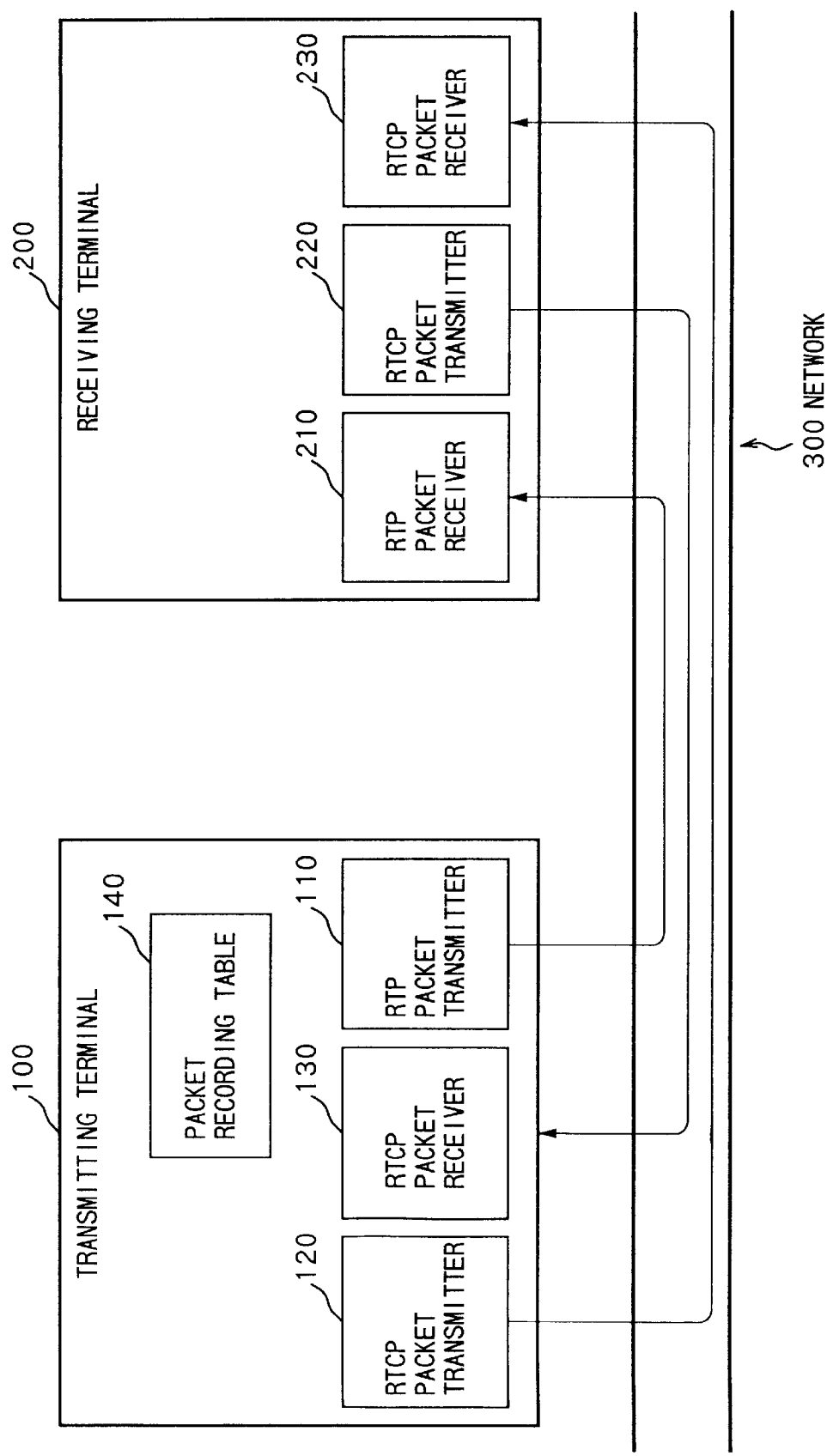
FIG. 8 is a diagram showing the overall configuration of a system according to the second embodiment.

FIG. 8 is an overall system diagram of this embodiment for implementing the processing set forth above. The operation of this system will now be described. It should be noted that blocks in FIG. 8 identical with those shown in FIG. 1 are designated by like reference characters. Though only a system composed of the transmitting terminal 100 and receiving terminal 200 connected by the network (e.g., the Internet) 300 is illustrated, a large number of terminals may be connected to the network. It will become obvious from the following description that the transmitting terminal and receiving terminal can be applied also to a case where both have cameras connected thereto and send and receive video to and from each other. The transmitting terminal 100 and receiving terminal 200 are both independent computers and may be personal computers or workstations.

In accordance with the RFC 1889 protocol, the receiving terminal 200 sends data (RTCP data) in compliance with the RTCP back to the transmitting terminal 100 at intervals of five seconds.

In the second embodiment, the transmitting terminal 100 transmits data (e.g., video data captured by a camera) to the receiving terminal 200 using RTP packets. Though the mechanism for sending and receiving RTP and RTCP data is implemented by software in this embodiment, a similar function can be implemented by hardware and therefore the present invention is not limited to this arrangement.

The transmitting terminal 100 and receiving terminal 200 send and receive data by RTP and transfer the relevant control data by RTCP as stipulated by the RTP (RFC 1889). The details of RTP and RTCP are well known and need not be described here.

The transmitting terminal 100 initially transmits data to the receiving terminal 200 at a rate designated by the user of the receiving terminal or at a preset rate. In any case, this rate will be referred to generically as the "target rate" hereinafter. The sending and receiving of this data is performed using RTP packets. If line conditions deteriorate and the data cannot be sent at the target rate, the transmission rate is reduced. When the line conditions improve, the transmission rate is raised and is made to approach the target rate. This is as mentioned earlier.

The transmitting terminal 100 and receiving terminal 200 exchange communications line control information using RTCP packets and perform rate control by employing these RTCP packets. Though the description is out of sequence, the transmitting terminal 100 transmits information to the receiving terminal in the form of packets in accordance with RTP. The packets are sent upon assigning sequence numbers to them. (The sequence numbers become successively larger.)

The receiving terminal 200 sends control information back to the transmitting terminal 100 in accordance with RTCP. The principal information contained in this control information (information which the receiving terminal 200 sends back to the transmitting terminal 100) is as follows:

a) the sequence number (referred to as "high-seq" below) of the final RTP packet accepted at transmission of RTCP packets;

b) the sum total (referred to as "cum-lost" below) of lost packets at transmission of RTCP packets;

c) time information (referred to as "timestamp" below) contained in the final RTP packet accepted from the transmitting terminal at transmission of RTCP packets; and d) time (delay since last sender report) from acceptance of an RTCP packet from the transmitting terminal to transmission of this RTCP packet.

The transmitting terminal 100 decides the transmission rate on the basis of information contained in the control information from the receiving terminal and the time at which this control information is received. According to this embodiment, the effective reception rate of the receiving terminal 200 and RTT are calculated from these items of information. The RTT is obtained by subtracting the time required for the receiving terminal to create RTCP data, which is for being sent back, from the time at which the timestamp contained in the RTCP data, which is sent back by the receiving side, and this RTCP data are received.

Figure 7:
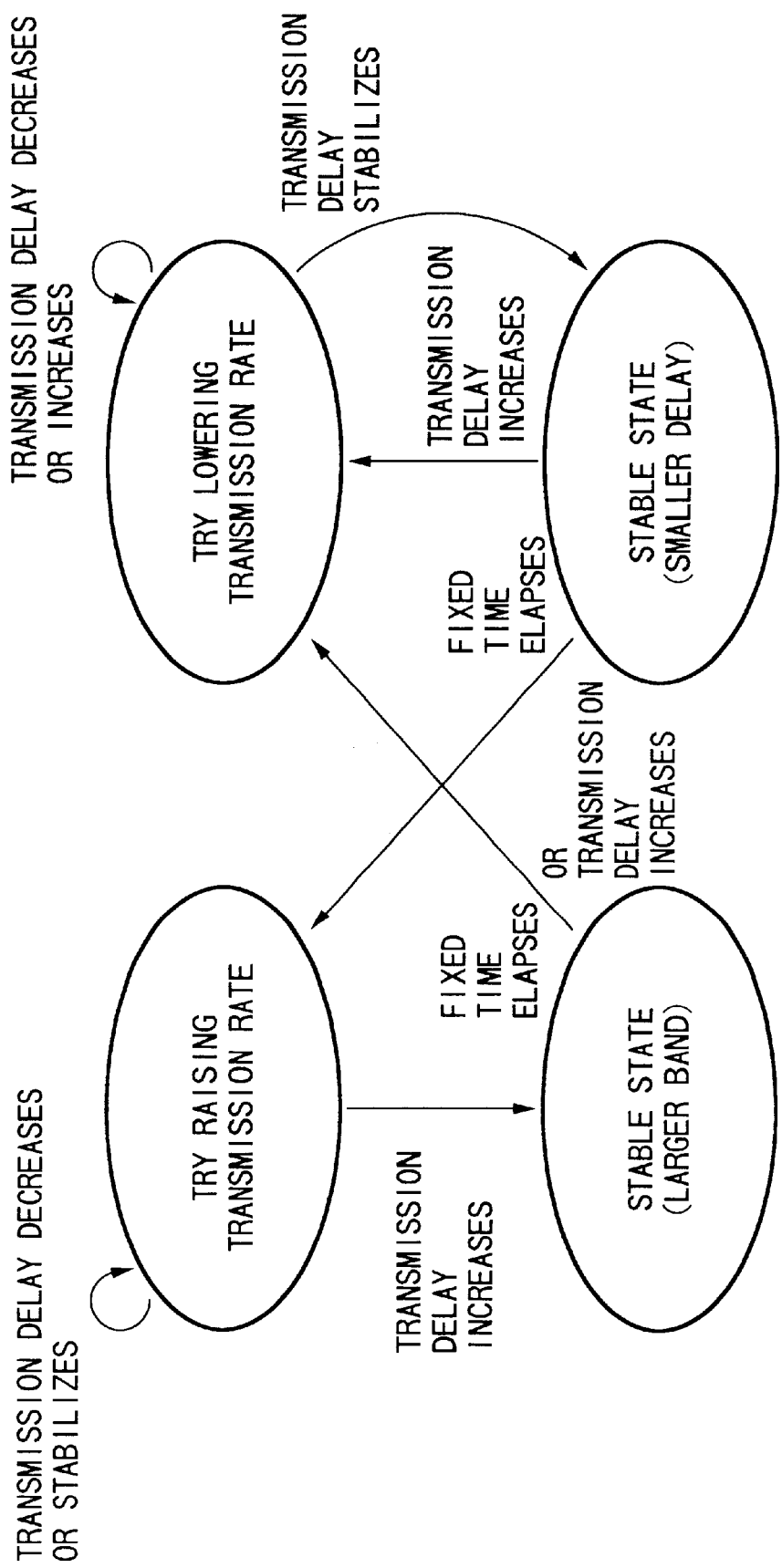
FIG. 7 is a status transition diagram showing the algorithm of a rate controller in a second embodiment of the present invention.

The transmission rate of the transmitting terminal 100 is decided by the algorithm, shown in FIG. 7 described earlier, using the effective reception rate as the standard. Ordinarily, a transmission is performed on the assumption that the transmission rate and the effective reception rate are equal. The RTT is used as an approximate value of line delay time to evaluate the result of transmission.

Transmission at a rate equivalent to the "effective reception rate +α" is performed periodically (whenever the RTCP data is received from the receiving terminal) and it is determined whether bandwith will be increased further. If the result is that RTT increases, i.e., that the time required for the round trip lengthens, then it is judged that the bandwidth is already being used to the fullest, a further increase in the transmission rate is halted and transmission is carried out for a prescribed period of time (10 seconds in this embodiment) at the ordinary transmission rate, i.e., the effective reception rate. (This state shall be referred to as the "high-rate stabilization state".)

Similarly, information is transmitted periodically at a transmission rate equivalent to the "effective reception rate −α" and it is determined whether a communications delay will be reduced. If the result is that RTT decreases, then it is judged that the communications delay will be reduced and, hence, the transmission rate continues to be decreased. If the RTT does not grow shorter, then it is judged that the communications delay is already minimal and, hence, a further decrease in transmission rate is halted and transmission is carried out at the ordinary transmission rate, i.e., the effective reception rate. (This state shall be referred to as the "low-rate stabilization state".)

A method of approximately calculating the effective reception rate will now be described. A method of calculating the RTT is set forth in RFC 1889 and is not described here.

In accordance with RTP, the transmitting terminal 100 cannot ascertain the effective reception rate of the receiving terminal 200 directly. Accordingly, approximate calculation of the effective reception rate is performed based upon information obtained from two RTCP packets (packets sent from the receiving terminal) and information (a packet recording table shown in FIG. 10 and described later) prevailing when packets are sent by the transmitting terminal 100.

Let the two RTCP packets (RTCP data sent back by the receiving terminal at intervals of five seconds) be represented by rtcp0, rtcp1 (rtcp0 is the packet that arrives first).

The arrival times of rtcp0 and rtcp1 are recorded by the transmitting terminal 100. As a result, the interval Δt between rtcp0 and rtcp1 is ascertained.

Figure 10:
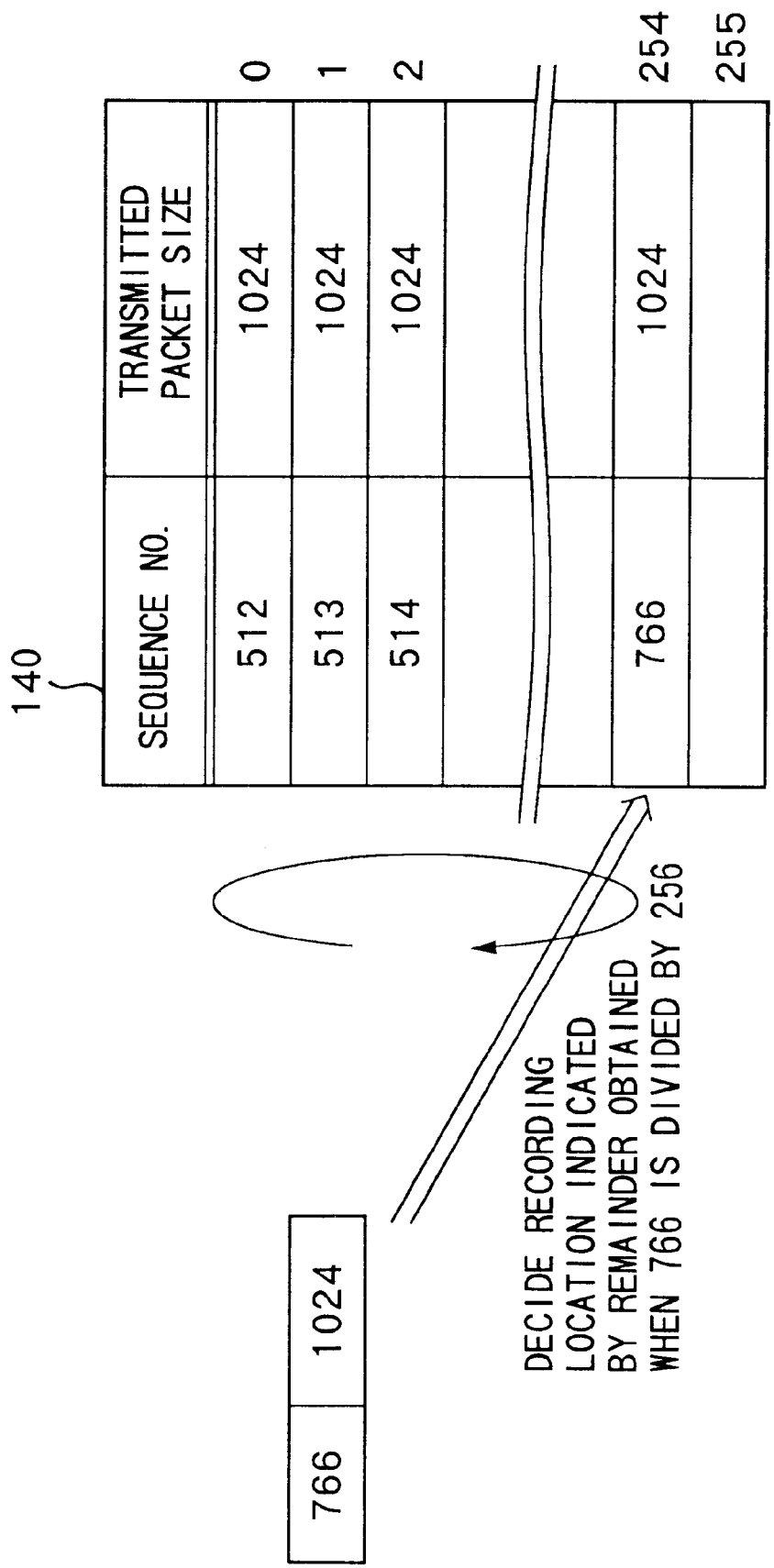
FIG. 10 is a diagram showing the structure of a packet recording table according to the second embodiment.

As for the amount of data sent by the transmitting terminal 100 during the time Δt, the sequence numbers (high-seq) contained in the respective packets rtcp0, rtcp1 are obtained by investigating the packet recording table shown in FIG. 10. For example, if high-seq contained in rtcp0 is "514" and high-seq contained in rtcp1 is "550", then the total size of the transmission from sequence numbers 514 to 550 in FIG. 10 need only be calculated. It should be noted that since the packet recording table is of limited size (it has a capacity that allows storage of 256 items in this embodiment), the table has a ring structure. For example, when an RIP packet (video data) is transmitted and the sequence number thereof is "766", the size of the transmission at this time is stored at a location indicated by "254", which is the value of the remainder obtained when 766 is divided by 256. In other words, the size is stored at the 254th location from the top of the table.

The packet loss rate during the time Δt also is calculated based upon high-seq and cum-lost contained in rtcp0, rtcp1. The number of packets sent by the transmitting terminal 100 during the time Δt can be determined from the difference between high-seq of rtcp1 and high-seq of rtcp0. The number of packets lost up to the receiving, terminal 200 during the time Δt, can be determined in a similar manner. Here cum-lost is a value obtained by subtracting the number of packets actually received from the number of transmitted packets. The packet loss rate is equal to the number of lost packets divided by the total number of transmitted packets.

Accordingly, the effect reception rate can be obtained by the following formula:

number of transmitted packets×(1−packet loss rate)/Δt.

The effective reception rate is calculated and stored in a memory or the like whenever an RTCP packet is received from the receiving terminal 200.

Figure 9:
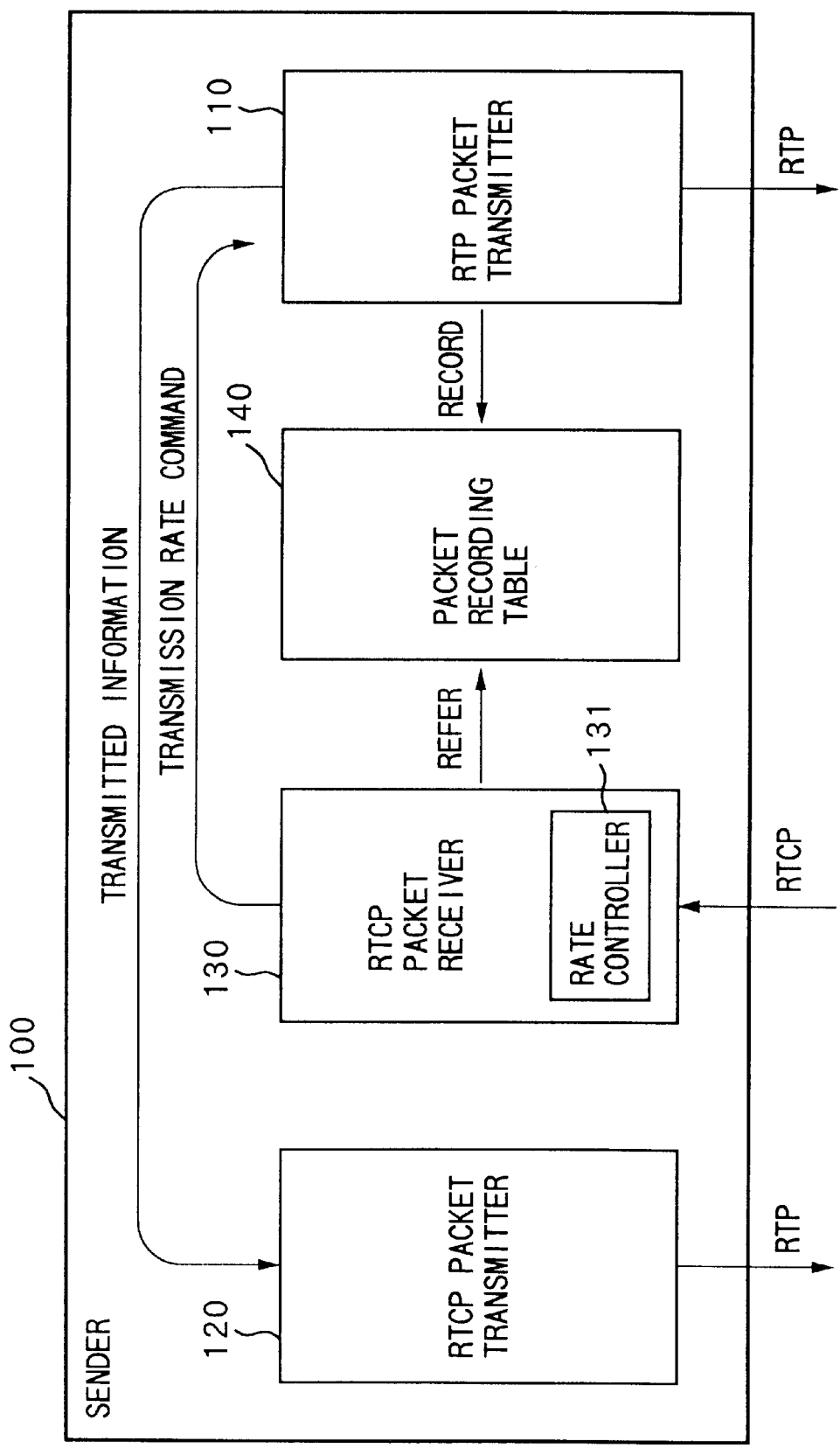
FIG. 9 is a block diagram of a transmitting terminal in the second embodiment.

The internal structure of the transmitting terminal 100 will be described with reference to FIG. 9. The transmitting terminal 100 includes the RTP packet transmitter 110, RTCP packet transmitter 120, RTCP packet receiver 130 and a packet recording table 140 (see FIG. 10). The RTCP packet receiver 130 includes a rate controller 131 for controlling transmission rate in this embodiment.

The RTP packet transmitter 110, RTCP packet transmitter 120 and RTCP packet receiver 130 operate entirely as separate threads but are linked to one another through shared variables.

The rate controller 131 is packaged in the form of a subroutine that is called from the thread of the RTCP packet receiver 130.

As shown in FIG. 10, the packet recording table records the sequence numbers of packets and the packet sizes prevailing at the time of these sequence numbers. The table is constructed in the form of a ring buffer in the manner illustrated. When information is recorded in the table, the recording location within the table is decided using, as an index, the remainder obtained when the sequence number of a packet is divided by the number of items constituting the table. As a result, information regarding the last 256 packets (where 256 is the size of the table) is retained.

The packet recording table 140 is shared by the RTP packet transmitter 110 and rate controller 131. The RTP packet transmitter 110 writes transmitted information to the packet recording table 140 whenever a packet is received.

The rate controller 131, which is called from within the RTCP packet receiver 130, basically updates the reception rate whenever an RTCP packet is received. The rate controller 131 accesses the packet recording table 140 at this time.

The flowcharts associated with these units are illustrated in FIGS. 11 to 15.

Figure 11:
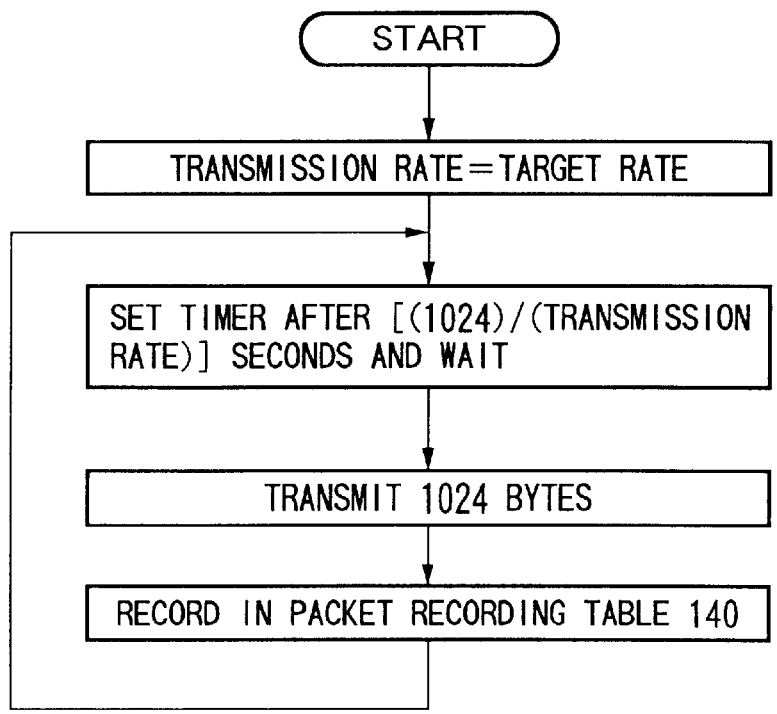
FIG. 11 is a flowchart showing the processing executed by an RTP transmitter of a transmitting terminal according to the second embodiment.

FIG. 11 is a flowchart of processing executed by the RTP packet transmitter 110 of the transmitting terminal 100.

The transmitting terminal outputs a packet having a size of 1024 bytes at fixed intervals [at intervals equivalent to (1024 bytes/transmission rate) sec], and stores the results of transmission in the packet recording table 140. This operation is performed repeatedly. The predetermined target rate is set as the initial value of the transmission rate. It should be noted that the "transmission rate" mentioned in this flowchart is shared by the rate controller 131 and is altered in accordance with the reception rate of the receiving terminal and the RTT obtained from the RTCP packet.

Figure 12:
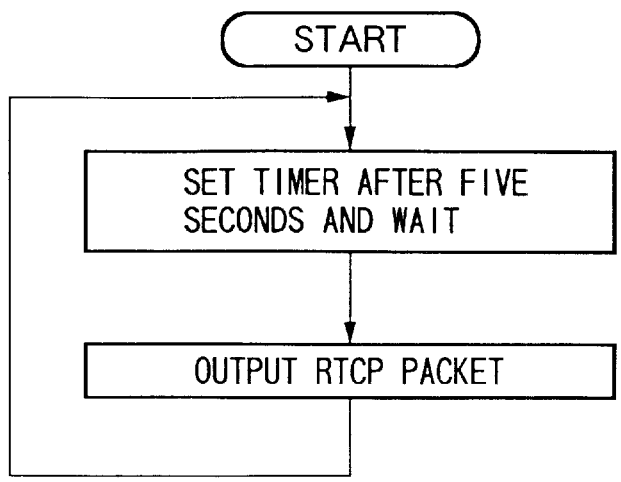
FIG. 12 is a flowchart showing the processing executed by an RTCP transmitter of the transmitting terminal according to the second embodiment.

FIG. 12 is a flowchart of processing executed by the RTCP packet transmitter 120 of the transmitting terminal 100. The RTCP packet transmitter 120 becomes active and outputs the RTCP packet every five seconds. The RTCP packet transmitter 120 creates the RTCP packet on the basis of the transmission information from the RTP packet transmitter 110. The details are well known and set forth in RFC 1889 and need not be described here.

Figure 13:
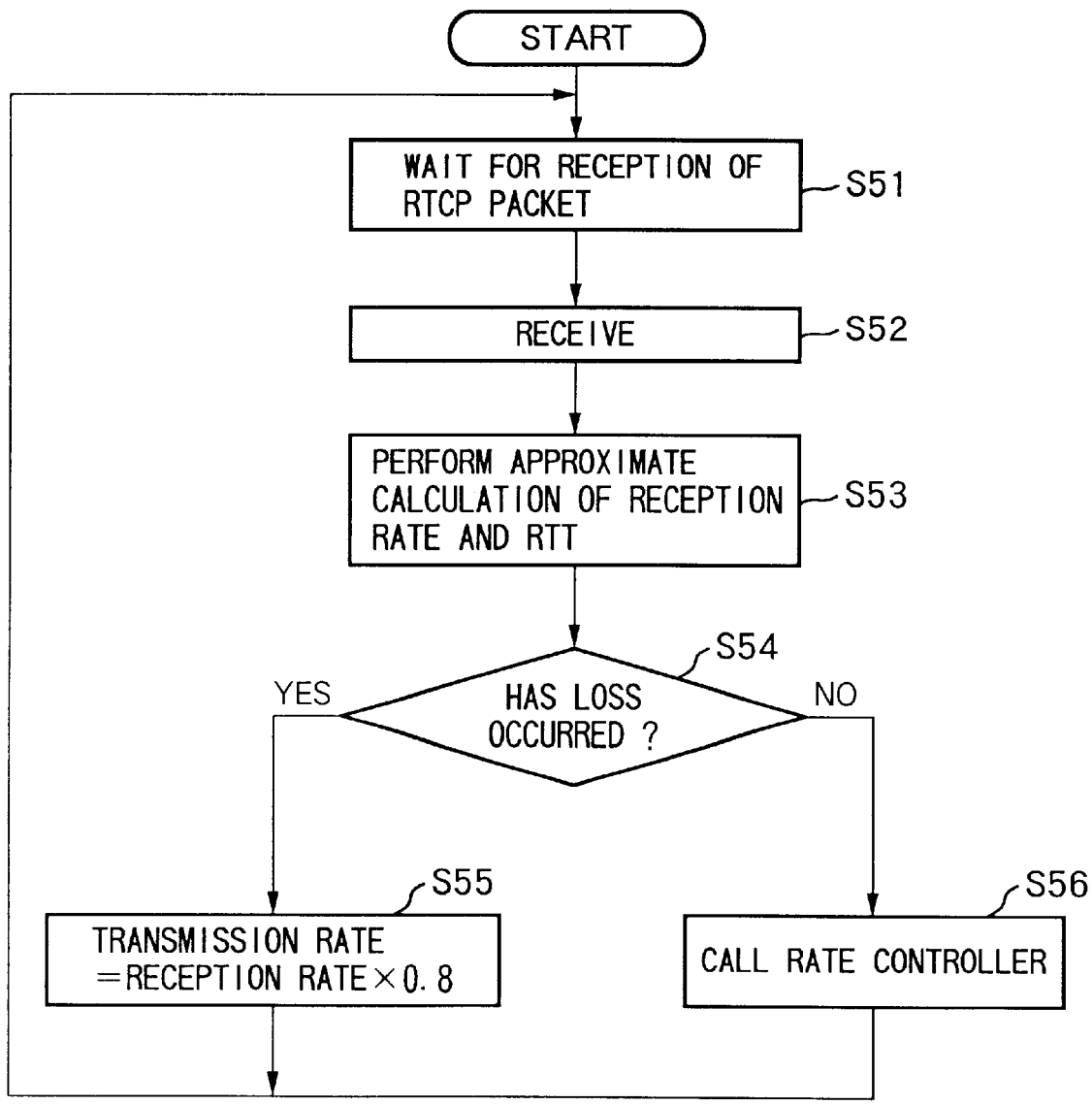
FIG. 13 is a flowchart showing the processing executed by the RTCP receiver of the transmitting terminal according to the second embodiment.
Figure 14:
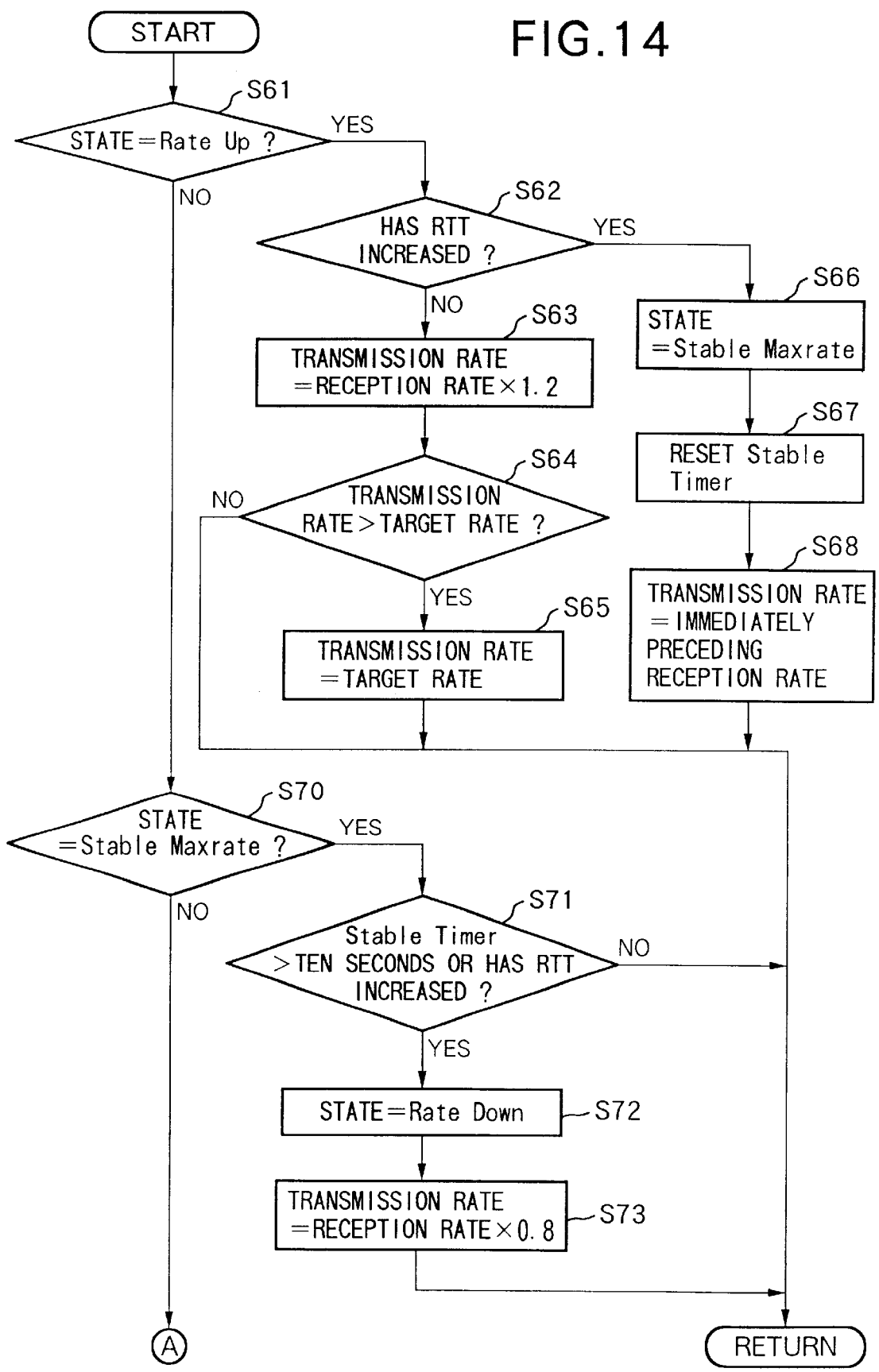
FIG. 14 is a flowchart showing the processing executed by a rate controller of a transmitting terminal according to the second embodiment.
Figure 15:
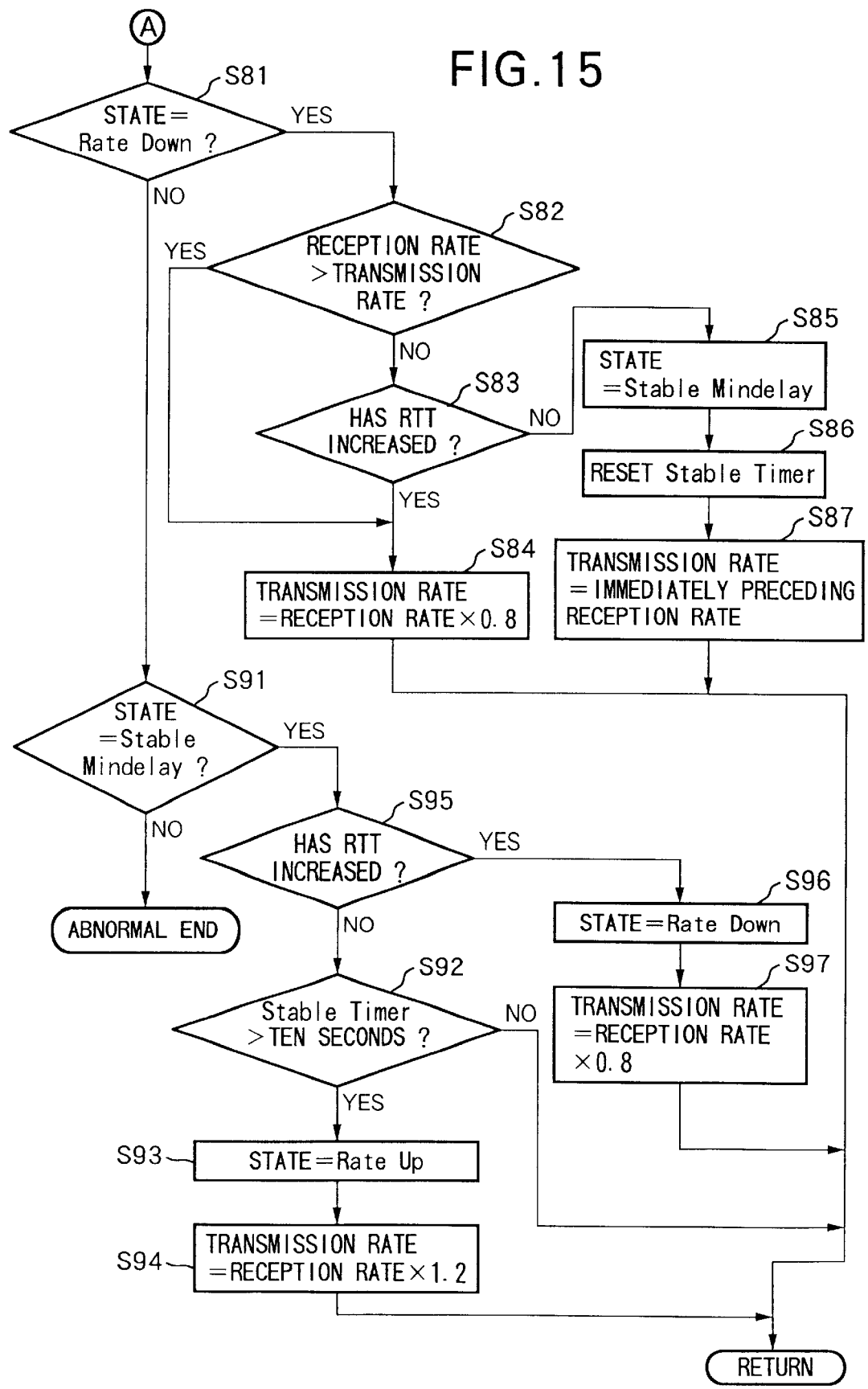
FIG. 15 is a flowchart showing the processing executed by the rate controller of the transmitting terminal according to the second embodiment.

FIGS. 13 to 15 are flowcharts of processing executed by the RTCP packet receiver 130 and rate controller 131 of the transmitting terminal 100.

FIG. 13 shows the flowchart associated with the RTCP packet receiver 130.

Upon receiving an RTCP packet (steps S51, S52), the RTCP packet receiver 130 approximately calculates the effective reception rate and RTT from the retch information (step S53). These methods of calculation are as set forth above.

In a case where packet loss has been detected by the receiving terminal (step S54), the transmission rate is made (current transmission rate)×0.8 to lower the transmission rate (step S55). In a case where packet loss has not occurred, control is delivered to the rate controller 131 (step S56).

FIGS. 14 and 15 illustrate the processing executed by the rate controller. Basically the processing is in accordance with the status transition diagram shown in FIG. 7.

When the state is a rate raising mode (Rate Up) ("YES" at step S61), this indicates a state in which the transmission rate is raised gradually while the RTT is monitored. If it is judged that the RTT does not increase even when the transmission rate is raised ("NO" at step S62), the transmission rate is set to the prevailing reception rate multiplied by 1.2 in order to raise the transmission rate (step S63). In other words, the transmission rate is raised by 20%. A value that exceeds the target rate is not set (steps S64, S65).

If RTT increases ("YES" at step S62), this means that a transmission that exceeded the bandwidth of the line has been performed. As a result, the state is caused to shift to the high-rate stabilization state (Stable Maxrate) (step S66). Here a timer (not shown) that measures the period of time during which the state is Stable Maxrate is reset (step S67), and the transmission rate is set to the immediately preceding reception rate.

If RTT increases when the state is the high-rate stabilization state (Stable Maxrate) ("YES" step S70), then the transmission rate is lowered and the state is switched to a rate lowering mode (Rate Down). This state is maintained until the content of the timer for measuring the time during which the state is Stable Maxrate exceeds 10 seconds without an increase in RTT.

If ten seconds elapse, the state is switched to Rate Down and the transmission rate is made the reception rate multiplied by 0.8 (steps S71 to S73).

When the state is Rate Down ("YES" at step S81), the transmission rate is lowered gradually while RTT is monitored. In a case where the rate is lowered, the previous transmission rate and the present reception rate are compared in order to wait for the result of lowering the rate to be fed back (step S82).

If the transmission rate is greater than the reception rate, it is judged that the result of lowering the rate has not yet been fed back and, hence, the rate is held low unconditionally without monitoring RTT. Otherwise it is determined whether RTT is decreasing (step S83). If RTT is decreasing, then the rate continues to be held low (step S84).

If RTT stops decreasing, then the state is changed to the low-rate stabilization state (Stable Mindelay) (step S85) and the timer is reset in order to maintain this state for ten seconds (step S86). The transmission rate is set to immediately preceding reception rate.

Thus, the low-rate stabilization state (Stable Mindelay) begins but, as long as RTT does not increase, the transmission rate does not fluctuate until this state lasts for more that ten seconds (steps S95, S92). In a case where ten seconds is exceeded, the state is changed to the Rate Up mode and the transmission rate is made the reception rate multiplied by 1.2 (steps S93, S94). If RTT increases, the state is changed to the Rate Down mode and the transmission rate is made the reception rate multiplied by 0.8.

As a result of the foregoing processing, data (video data that has been captured by a camera according to this embodiment) is transmitted from the transmitting terminal 100 to the receiving terminal 200 at a transmission rate that follows up the conditions of the network (line) and a transfer suited to a case where a real-time transmission is required is achieved. Moreover, it is so arranged that a transmission will not be made at a transmission rate that exceeds a target rate. As a result, under conditions where an unspecified large number of users are using a network, particularly a network such as the Internet, it is possible to minimize the influence upon other users.

As mentioned earlier, the transmitting terminal 100 and receiving terminal 200 in the second embodiment are both based upon personal computers or workstations, just as in the first embodiment. Though they require hardware (an NIC, modem, TA, etc.) for being connected to a network and hardware for generating real-time data (a camera serving as a storage device for storing motion pictures), the majority of the associated processing is implemented by software.

Accordingly, it is obvious that the present invention may be attained by supplying a storage medium storing the program codes of the software for performing the functions of the foregoing embodiments to a system or an apparatus, reading the program codes from the storage medium and executing them by a computer (e.g., a CPU or MPU) of the system or apparatus.

In this case, the program codes read from the storage medium implement the functions of the embodiments, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiment.

Thus, in accordance with the second embodiment, as described above, communication can be carried out with a minimal transmission delay even in the case of a network of the kind in which data is buffered on the network and transmission delay lengthens when the transmission is performed at an excessive speed.

In the second embodiment, the settings are such that the RTCP data has intervals of five seconds and the stable state is attained in ten seconds. However, the present invention is not limited by these values and any values that are suitable may be used. Further, according to the second embodiment, a change in the state of reception delay (particularly the length of the transmission delay) is detected based upon two consecutive items of RTCP data from the receiving terminal. It goes without saying, however, that the number of consecutive items of RTCP data may be three or more.

In accordance with the second embodiment, as described above, an appropriate transmission rate is established dynamically in dependence upon the conditions of a network so that it becomes possible to perform communication with the minimum transmission delay.

Furthermore, in prior art, since the transmission rate is controlled by the loss rate only, and since the time interval of transmitting rate information (RTCP) is long, response speed to the control of the transmission rate was slow. On the contrary, according to the above embodiments of the present invention, since the transmission rate is controlled by the transmission delay time rather than the loss rate, the transmission delay time can be reduced and the response speed to the control of the transmission rate can become quick, because the rate information is transmitted frequently for changing the transmission rate.

As many apparently widely different embodiments of the present invention can be made without departing from the spirit and scope thereof, it is to be understood that the invention is not limited to the specific embodiments thereof except as defined in the appended claims.

What is claimed is:

1. A communications control method for transmitting data from a transmitting terminal to a receiving terminal via a prescribed network and transmitting, at prescribed intervals, control information for ascertaining a status of the network, said method comprising steps of:

detecting a change in the status of a transmission rate of the network; and adjusting, in dependence upon the detected change in the status, a frequency at which the control information is transmitted, wherein the transmitting terminal transmits the control information more frequently during changing of the transmission rate than when the transmission rate does not change.

2. The method according to claim 1, wherein the status of the network is detected by monitoring a difference between the transmission rate of the transmitting terminal and a reception rate of the receiving terminal.

3. The method according to claim 1, wherein, in a case in which an actual transmission rate is lower than a prescribed target transmission rate for the data, the transmitting terminal raises the transmission rate by a predetermined percentage and transmits the control information to the receiving terminal irrespective of the prescribed intervals.

4. The method according to claim 1, wherein the prescribed intervals are prescribed time intervals.

5. The method according to claim 1, further comprising steps of, executed by the transmitting terminal,:

judging, based on reception information received from the receiving terminal, whether a loss has occurred in transmitted data; and, if it is judged that a loss has occurred, lowering the transmission rate by a predetermined percentage and transmitting the control information to the receiving terminal irrespective of the prescribed intervals.

6. The method according to claim 1, wherein the data is a packet transmission in accordance with RTP, and the control information is a packet transmission in accordance with RTCP.

7. The method according to claim 1, further comprising a step of transmitting control information from the receiving terminal to the transmitting terminal in a case in which a difference between the transmission rate of the data from the transmitting terminal and a reception rate is greater than a predetermined value.

8. A communications control system for transmitting data from a transmitting terminal to a receiving terminal via a prescribed network and transmitting, at prescribed intervals, control information for ascertaining a status of the network, comprising:

a detection device adapted to detect a change in the status of the network; and an adjustment device adapted to adjust, in dependence upon the detected change in the status, a frequency at which the control information is transmitted, wherein the transmitting terminal transmits the control information more frequently during changing of the transmission rate than when the transmission rate does not change.

9. A storage medium storing a computer-readable program for implementing a control method of a communications control system for transmitting data from a transmitting terminal to a receiving terminal via a prescribed network and transmitting, at prescribed intervals, control information for ascertaining a status of the network, wherein the method comprises steps of:

detecting a change in the status of the network; and adjusting, in dependence upon the detected change in the status, a frequency at which the control information is transmitted, wherein the transmitting terminal transmits the control information more frequently during changing of the transmission rate than when the transmission rate does not change.

10. A communications apparatus for transmitting first information to a receiving terminal via a prescribed network and receiving second information, which includes information about a reception status of the receiving terminal, transmitted by the receiving terminal at prescribed time intervals, comprising:

a detection device adapted to detect the second information from the receiving terminal; and a control device adapted to control a transmission rate of the first information in dependence on the second information, wherein said control device varies the transmission rate of the first information when the second information from the receiving terminal is received by said detection device, and stops varying the transmission rate of the first information if a change in the reception status of the receiving terminal vanishes when varying the transmission rate of the first information.

11. The apparatus according to claim 10, wherein the second information is obtained from a state of a transmission delay, which is a length of a round-trip time of an information transmission.

12. The apparatus according to claim 10, wherein said control device controls the transmission rate to be less than a prescribed target transmission rate of the first information, even if there is no change in a transmission delay while the transmission rate is being raised.

13. The apparatus according to claim 10, wherein protocol for communication with the receiving terminal is in accordance with RFC 1889.

14. A communications method in a communications apparatus for transmitting first information to a receiving terminal via a prescribed network and receiving second information, which includes information about a reception status of the receiving terminal, transmitted by the receiving terminal at prescribed time intervals, said method comprising steps of:

detecting the second information from the receiving terminal; and controlling a transmission rate of the first information in dependence on the second information, wherein the transmission rate of the first information is varied in said controlling step when the second information from the receiving terminal is received in said detecting step, and varying of the transmission rate of the first information is stopped if a change in the reception status of the receiving terminal vanishes when varying the transmission rate of the first information.

15. A storage medium storing program code for implementing a method of controlling a communications apparatus for transmitting first information to a receiving terminal via a prescribed network and receiving second information, which includes information about a reception status of the receiving terminal, transmitted by the receiving terminal at prescribed time intervals, comprising:

program code of a detection step of detecting a state of transmission delay based upon the second information from the receiving terminal; and program code of a control step of controlling a transmission rate in dependence on the detected state of the transmission delay, wherein the transmission rate of the first information is varied in the control step when the second information from the receiving terminal is received in the detection step, and varying of the transmission rate of the first information is stopped if a change in the transmission delay vanishes when varying the transmission of the first information.

* * * * *